United States Patent Office 2,798,051
Patented July 2, 1957

2,798,051

METHOD OF MANUFACTURING A SUPPORTED CATALYST

Edward J. Bicek, La Grange, Ill., assignor to Universal Oil Products Company, Des Plaines, Ill., a corporation of Delaware No Drawing. Application May 19, 1953,
Serial No. 356,117

6 Claims. (Cl. 252—466)

The present invention relates to a method of manufacturing a supported catalytic contact material and particularly to a method of manufacturing a supported catalyst on which the catalytic material is uniformly distributed over the support material and in finely divided high surface area condition.

It is an object of this invention to provide a method of compositing a catalytic material with a solid adsorptive support so that the catalytic material is uniformly distributed on the support in extremely small particles or as layers one or more molecules thick.

It is well-known that a catalytic material may be much more efficiently used when in an extended surface condition, that is, when dispersed as finely divided particles on a carrying medium such as an adsorptive inorganic oxide. Many methods have been devised for compositing the catalytic material with the carrying medium. All of these methods have been aimed at compositing the catalytic material in an extremely finely divided condition and with uniform distribution on the carrying material. It is particularly important to gain the maximum surface area for the minimum weight of catalytic material when the catalytic material is a rare, expensive or noble metal such as platinum, palladium, gold etc. The present invention provides a means of dispersing an active metal onto the surface of a carrying material so that the catalytic material is in the form of extremely fine particles that are uniformly distributed over the surface of the supporting material or as a layer one or more molecules thick.

It is an embodiment of this invention to prepare a supported catalytic material by a method which comprises successively treating an adsorptive support or carrying material with at least two gases, one of said gases comprising a vapor yielding an active catalyst upon suitable reaction and another of said gases comprising a precipitating agent reactive with the former gas to yield the catalytic material.

It is another embodiment of this invention to prepare a catalytic material by a method which comprises treating an adsorptive support or carrying material first with a gaseous precipitating component and subsequently treating the support, which has the precipitating component adsorbed thereon, with a gas that contains the active catalytic material whereby the catalytic material is precipitated onto the surface of the adsorptive support.

It is another embodiment of this invention to prepare a supported catalytic material by a method which comprises treating an adsorptive support or carrying material with an active catalytic material-containing gas, which yields an active catalytic material upon suitable reaction, and subsequently treating the carrying material, which has the catalytic-containing gas adsorbed thereon, with a gas that contains a precipitating component whereby the active catalytic material is precipitated on the surface of the adsorptive base.

In a more specific embodiment the present invention relates to a method of manufacturing a catalytic material which comprises successively treating an adsorptive support with at least two gaseous reactants, one of said gaseous reactants comprising water vapor and another of said gaseous reactants comprising a hydrolyzable metal-containing gas.

In another specific embodiment the present invention relates to a method of preparing a supported catalytic material which comprises successively treating an adsorptive support with at least two gases, one of said gases comprising water vapor and another of said gases comprising a metal carbonyl chloride or a metal carbonyl.

In a preferred embodiment the present invention relates to a method of manufacturing a supported platinum-containing catalyst which comprises successively treating an adsorptive support with at least two gases, one of said gases comprising water vapor and another of said gases comprising platinum carbonyl chloride.

The method of this invention may be described as compositing a catalytic material in extremely finely divided form with a carrying medium by causing a reaction between a catalytic material-containing gas and a precipitating gas to occur on the surface of the carrying material. The term, "catalytic material-containing gas" as used in the specification and following claims refers to a gas that yields a catalytic material upon reaction with a precipitating gas or one which yields a material fixed on the support which may be converted to a catalytic material upon subsequent treatment.

The method of this invention may be accomplished by first treating an adsorptive support which may be any of the common inorganic oxides such as synthetically prepared silica, alumina, magnesia, mixtures such as silica-alumina, silica-magnesia, silica-zirconia, silica-alumina-zirconia, or naturally occurring materials such as kieselguhr, bauxite, diatomaceous earth, pumice, clay, etc., which may be acid treated, calcined or otherwise prepared or any combinations thereof or materials such as activated charcoal, cellulose, starch, etc. with a precipitating component which is defined as a gaseous material which will adsorb on the surface of the support material and will also react with a vapor of a compound of a catalytic material to be precipitated on the adsorptive support. The method may also be accomplished by first treating the adsorptive support with the catalytic material-containing gas and subsequently treating the conditioned support, which has the catalytic material-containing gas adsorbed thereon, with the precipitating component.

When the precipitating component is the first used, it is necessary that the precipitating component be one that is adsorbed on the supported material and may include such gases as $H_2O$, oxygen, sulfur dioxide, hydrogen sulfide, ammonia, carbon dioxide, etc. The catalytic materials that are capable of being used in the process of this invention are as hereinbefore stated, those which form compounds that exist in the vapor state at reasonable temperatures, which will react with the precipitating component to form a catalytic material. Some typical examples of catalytic material-containing gases are metal carbonyls such as the carbonyls of iron, cobalt, nickel, ruthenium, rhodium, palladium, platinum, gold, silver, copper, chromium, molybdenum, tungsten, etc., substituted metal carbonyls such as platinum carbonyl halides including the chlorides, bromides, and iodides, palladium carbonyl halides, cobalt nitroso carbonyl, etc. As a typical example, by contacting spongy platinum with a mixture of chlorine gas and carbon monoxide at a temperature of 250° C., platinum carbonyl chloride, a compound that sublimes at 250° C. may be obtained. The platinum carbonyl chloride vapor thus obtained when contacted with water, rapidly and completely dissociates to form platinum metal. The platinum metal thus formed is in extremely finely divided form, the particles approaching molecular size. Platinum carbonyl chloride may also be prepared by contacting platinum chloride with carbon monoxide at appropriate temperatures and pressures.

Other metal-containing compounds than the carbonyls and substituted carbonyls are vaporizable at reasonable temperatures and pressures and may be used in the process of this invention as a catalytic material-containing gas. For example, aluminum chloride may be vaporized at 178° C., and when contacted with an adsorptive support such as silica that has been treated or conditioned with water vapor, will form aluminum hydroxide on the surface of the silica support. Upon subsequent drying, one of the forms of alumina will result thereby forming a silica-alumina composite. Other catalytic material-containing gases may include titanium tetrachloride, silicon fluoride, silicon chloride, silicon chlorohydride, dimethyldichlorosilane, dimethyldiaminosilane etc. It may readily be seen that this invention broadly comprises the process of successive treatments to form multi-component catalysts or supported catalysts having greater concentrations of catalytic material.

An adsorptive support is treated or conditioned with a gas by contacting the support with the gas at a temperature and pressure regulated so that the gas is adsorbed on the support. The adsorbed gas forms a layer or film distributed over the entire surface of the support. A support having a layer of gas adsorbed thereon, hereinafter called a conditioned support, is subsequently contacted with an appropriate gas thereby precipitating a catalytic material in a correspondingly distributed layer.

In determining whether to condition the adsorptive base with the catalytic material-containing gas first or the precipitating component first one must consider the adsorption characteristics of the base in respect to the various gases employed, the temperatures at which the gases exist, the reaction conditions of the precipitating component with the catalytic material-containing gas, the cost of the various materials and many other factors both economic and technical. The amount of catalytic material composited with the support may be controlled by selecting which of the two gases to first adsorb on the base, the amount of gas adsorbed thereon which may be controlled by temperature, pressure, concentration, etc., the amount of the other gas and its concentration etc. Generally, when it is desired to adsorb more gas on the support, the temperature is decreased and the pressure is increased. When it is desired to adsorb less gas on the support the temperature may be increased, the pressure decreased and the gas may be mixed with a diluent gas that adsorbs readily on the support but is inert with regard to the other component. Suitable diluents may be hydrogen, carbon dioxide etc.

Although the present invention is suitable for preparing supported catalysts containing small amounts of active metal, for example, as low as 0.01% by weight, it may be used to prepare composites having a greater quantity of active metal for example a monolayer or more which may be accomplished if necessary by successively treating the support. For example, a support such as alumina may be conditioned with water vapor and subsequently contacted with a gas containing palladium carbonyl chloride vapors to deposit finely divided palladium on the surface of the support, after which the same treatment may be repeated as frequently as necessary until the desired amount of palladium is composited with the support. Combinations may also be employed such as compositing palladium with alumina as hereinbefore described and subsequently conditioning the palladium-alumina composite with water vapor and contacting with silicon tetrafluoride gas to form a resultant silica-alumina-palladium composite. When the composite has been formed it may be further treated to change its chemical or physical characteristics by such means as reducing some of the metal oxide to pure metal in a hydrogen or hydrocarbon atmosphere, by oxidizing metals to form metal oxides, by treatment with hydrogen sulfide to form sulfides, by causing to react mixtures such as silica-alumina to form aluminum silicate, by calcining in air or other atmospheres to change crystal size or surface characteristics, etc.

The catalyst prepared in accordance with the present invention may be used for many conversions including cracking or hydrocracking a hydrocarbon to form lower boiling hydrocarbons by contacting the hydrocarbons to be cracked with a suitable catalyst at a temperature of from about 700° F. to about 1200° F. and at a pressure of from atmospheric to about 2000 p. s. i. or more, reforming gasoline fractions to improve the motor fuel characteristics by contacting the gasoline fraction with a suitable catalyst at a temperature of from about 650° F. to about 1000° F. in the presence of hydrogen at a pressure of from about 50 p. s. i. to about 1000 p. s. i. or more, polymerization of olefinic hydrocarbons to form higher boiling hydrocarbons, alkylation reactions, hydrogenation and dehydrogenation reactions, hydration and dehydration reactions, partial or complete oxidation reactions, treating reactions wherein small quantities of impurities are removed as for example the desulfurization of gasoline, hydrogen or alkyl transfer reactions, esterification reactions, selective adsorptive processes, and many others. These reactions may be effected in any suitable apparatus in fixed bed processes, moving bed processes wherein the catalyst and reactants are in concurrent downward flow in a reaction chamber, fluidized processes wherein the reactants are contacted concurrently with the catalyst in dispersed phase generally with the reactants acting as a transporting medium for the catalyst, slurry type processes etc.

In many of the above processes the catalyst will be covered with carbonaceous deposits as a result of the reaction effected or may be poisoned as a result of the reaction effected. Catalysts that have lost their activity through either of these means may be regenerated by contacting the spent catalyst with air or other suitable regeneration gases such as hydrogen, steam, etc. and the activity of the catalyst may be at least partially restored so that the catalyst may be used to effect further reactions.

Following are four examples presented to further illustrate the process of this invention but not intended to unduly limit the invention to the particular process and materials herein described.

*Example I*

Spongy platinum metal is treated with chlorine gas at 360° C. to form platinum chloride. The resulting platinum chloride is treated with carbon monoxide gas at 250° C. forming a mixture of platinum carbonyl chloride which corresponds to the formulas $PtCl_2 \cdot CO$, $PtCl_2(CO)_2$, and $PtCl_2 \cdot 3CO$ which compounds sublime at that temperature. The vapors from this reaction are passed into contact with alumina that has been treated as follows: alumina prepared by any suitable method is placed in an atmosphere of moist air, maintainted at atmospheric pressure at 250° C. After being treated a sufficient length of time so that equilibrium is obtained between the moist air and the alumina, the air is flushed from the treating chamber with nitrogen gas at 250° C. The conditioned alumina base thus prepared is contacted, while in the same chamber, with platinum carbonyl chloride vapors prepared as above described, thereby producing a composite of alumina and platinum metal. The composite thus obtained is dried and calcined.

*Example II*

Kieselguhr purified and treated to have high adsorptive qualities is placed in an atmosphere of hydrogen sulfide. When equilibrium has been established the hydrogen sulfide is removed by flushing with nitrogen, and while in the same chamber, the conditioned kieselguhr is contacted with nickel carbonyl which was previously prepared by contacting spongy nickel metal with carbon monoxide at a temperature of 100° C. and at a pressure of 1500 p. s. i. The resultant nickel sulfide kieselguhr composite is reduced with hydrogen to form a nickel-kieselguhr composite.

*Example III*

Synthetic silica is treated with aluminum chloride vapors at 200° C. until equilibrium is established between the vapors and the silica, the aluminum chloride vapors are flushed from the treating chamber with nitrogen gas and the conditioned silica, while maintained in the same chamber, is subsequently treated with substantially saturated air at a temperature of 120° C. The aluminum chloride hydrolyzes on the surface of the silica support thereby forming aluminum hydroxide. The composite is then dried and calcined to form a silica-alumina composite.

*Example IV*

The composite of Example III is treated with substantially saturated air at 120° C. at atmospheric pressure after which the air is removed from the treating chamber and the composite is contacted with titanium tertachloride vapors. The resulting composite is dried and calcined to form a silica-alumina-titania composite.

I claim as my invention:

1. A process for the manufacture of a supported catalyst which comprises successively treating a solid adsorptive catalyst support with at least two gases, one of said gases consisting essentially of vaporous platinum carbonyl chloride and another of said gases consisting essentially of water vapor, said support being non-reactive with the platinum carbonyl chloride, adsorbing one of said gases on the surface of said catalyst support and there reacting it with the other of said gases to deposit platinum metal on the surface of the adsorptive support.

2. A process for the manufacture of a supported platinum catalyst which comprises adsorbing water vapor on the surface of a solid adsorptive catalyst support, thereafter contacting the solid support with platinum carbonyl chloride vapors and reacting the latter with the adsorbed $H_2O$ to precipitate platinum on the surface of said solid support, said support being non-reactive with the platinum carbonyl chloride vapors.

3. A process for the manufacture of a supported platinum catalyst which comprises adsorbing platinum carbonyl chloride vapors on the surface of a solid adsorptive catalyst support, which is non-reactive with said vapors, thereafter contacting the solid support with water vapor and reacting the latter with the adsorbed platinum carbonyl chloride to precipitate platinum on the surface of said solid support.

4. A process for the manufacture of a supported platinum catalyst which comprises treating adsorptive alumina with platinum carbonyl chloride vapor and with water vapor, adsorbing one of said vapors on the surface of the alumina and there reacting it with the other of said vapors to deposit platinum metal on the surface of the alumina.

5. A process for the manufacture of a supported platinum catalyst which comprises adsorbing water vapor on the surface of adsorptive alumina, thereafter contacting the alumina with platinum carbonyl chloride vapors and reacting the latter with the adsorbed $H_2O$ to precipitate platinum on the surface of the alumina.

6. A process for the manufacture of a supported platinum catalyst which comprises adsorbing platinum carbonyl chloride vapors on the surface of adsorptive alumina, thereafter contacting the alumina with water vapor and reacting the latter with the adsorbed platinum carbonyl chloride to precipitate platinum on the surface of the alumina.

References Cited in the file of this patent

UNITED STATES PATENTS

| | | |
|---|---|---|
| 1,818,909 | Reerink | Aug. 11, 1931 |
| 2,514,961 | Max | July 11, 1950 |
| 2,533,071 | Vesterdal et al. | Dec. 5, 1950 |
| 2,599,978 | Davis et al. | June 10, 1952 |
| 2,602,033 | Lander | July 1, 1952 |

OTHER REFERENCES

J. Electrochemical Soc., October 1951, pp. 385–387.